(12) United States Patent
Higuchi et al.

(10) Patent No.: US 11,731,638 B2
(45) Date of Patent: Aug. 22, 2023

(54) DRIVING ASSISTANCE APPARATUS, DRIVING ASSISTANCE METHOD, AND NON-TRANSITORY STORAGE MEDIUM

(71) Applicants: TOYOTA JIDOSHA KABUSHIKI KAISHA, Toyota (JP); DENSO TEN Limited, Kobe (JP)

(72) Inventors: Hidetsugu Higuchi, Nagoya (JP); Hiromi Tonegawa, Nagoya (JP); Kenji Tsumura, Nagoya (JP); Hideaki Miyazaki, Kobe (JP)

(73) Assignees: TOYOTA JIDOSHA KABUSHIKI KAISHA, Toyota (JP); DENSO TEN Limited, Kobe (JP)

( * ) Notice: Subject to any disclaimer, the term of this patent is extended or adjusted under 35 U.S.C. 154(b) by 34 days.

(21) Appl. No.: 17/372,766

(22) Filed: Jul. 12, 2021

(65) Prior Publication Data
US 2022/0017104 A1    Jan. 20, 2022

(30) Foreign Application Priority Data
Jul. 15, 2020  (JP) ................ 2020-121589

(51) Int. Cl.
| | | |
|---|---|---|
| B60W 40/103 | (2012.01) | |
| B60W 40/068 | (2012.01) | |
| B60W 40/105 | (2012.01) | |
| H04L 12/40 | (2006.01) | |

(52) U.S. Cl.
CPC ........ *B60W 40/103* (2013.01); *B60W 40/068* (2013.01); *B60W 40/105* (2013.01); *H04L 12/40* (2013.01); *B60W 2552/40* (2020.02); *B60W 2555/20* (2020.02);
(Continued)

(58) Field of Classification Search
CPC ............ B60W 40/103; B60W 40/068; B60W 40/105; B60W 2552/40; B60W 2556/45; B60W 2555/20; H04L 12/40; H04L 2012/40215; H04L 2012/40273
See application file for complete search history.

(56) References Cited

U.S. PATENT DOCUMENTS

| | | | | |
|---|---|---|---|---|
| 5,308,153 | A | * | 5/1994 | Kidston .............. B60T 8/17636 303/162 |
| 8,930,114 | B1 | * | 1/2015 | Reid ..................... B60T 8/1708 280/204 |
| 2017/0001646 | A1 | * | 1/2017 | Cooke ................... B60W 10/20 |

(Continued)

FOREIGN PATENT DOCUMENTS

| | | |
|---|---|---|
| JP | 06-127405 A | 5/1994 |
| JP | 2014202498 A | * 10/2014 |

*Primary Examiner* — Behrang Badii
*Assistant Examiner* — Jay Khandpur
(74) *Attorney, Agent, or Firm* — Sughrue Mion, PLLC

(57) ABSTRACT

A driving assistance apparatus includes a processor having hardware. The processor is configured to acquire vehicle speed data before an ABS of a vehicle is activated and vehicle speed data when the ABS of the vehicle is stopped, calculate a coefficient of sliding friction based on the vehicle speed data before the ABS is activated and the vehicle speed data when the ABS is stopped, determine whether the coefficient of sliding friction is equal to or smaller than a threshold, and detect that a slip due to road freezing has occurred when the coefficient of sliding friction is equal to or smaller than the threshold.

20 Claims, 15 Drawing Sheets

(52) U.S. Cl.
CPC .................... *B60W 2556/45* (2020.02); *H04L 2012/40215* (2013.01); *H04L 2012/40273* (2013.01)

(56) References Cited

U.S. PATENT DOCUMENTS

| | | | |
|---|---|---|---|
| 2020/0079381 A1* | 3/2020 | Lombrozo | B62D 6/003 |
| 2020/0262439 A1* | 8/2020 | Wyciechowski | B60W 40/068 |
| 2020/0378324 A1* | 12/2020 | Light-Holets | F02D 13/06 |
| 2021/0241546 A1* | 8/2021 | Chafekar | G07C 5/0808 |

* cited by examiner

FIG. 5

| | ROAD CATEGORY | | COEFFICIENT OF SLIDING FRICTION |
|---|---|---|---|
| 1 | VERY SLIPPERY ICE FILM | ~0.15 | |
| | VERY SLIPPERY ICE LAYER | ~0.20 | |
| | VERY SLIPPERY COMPACTED SNOW | | |
| 2 | ICE LAYER | 0.15~0.20 | |
| | ICE LAYER UNDER POWDER SNOW | | |
| | ICE FILM | 0.15~0.30 | |
| 3 | ICE LAYER UNDER POWDER SNOW | 0.20~0.30 | |
| | COMPACTED SNOW | | |
| 4 | POWDER SNOW | 0.25~0.35 | |
| | SNOW GRAIN | | |
| | WET SNOW | | |
| 5 | HUMID | 0.45~ | |
| | DRY | | |

T1

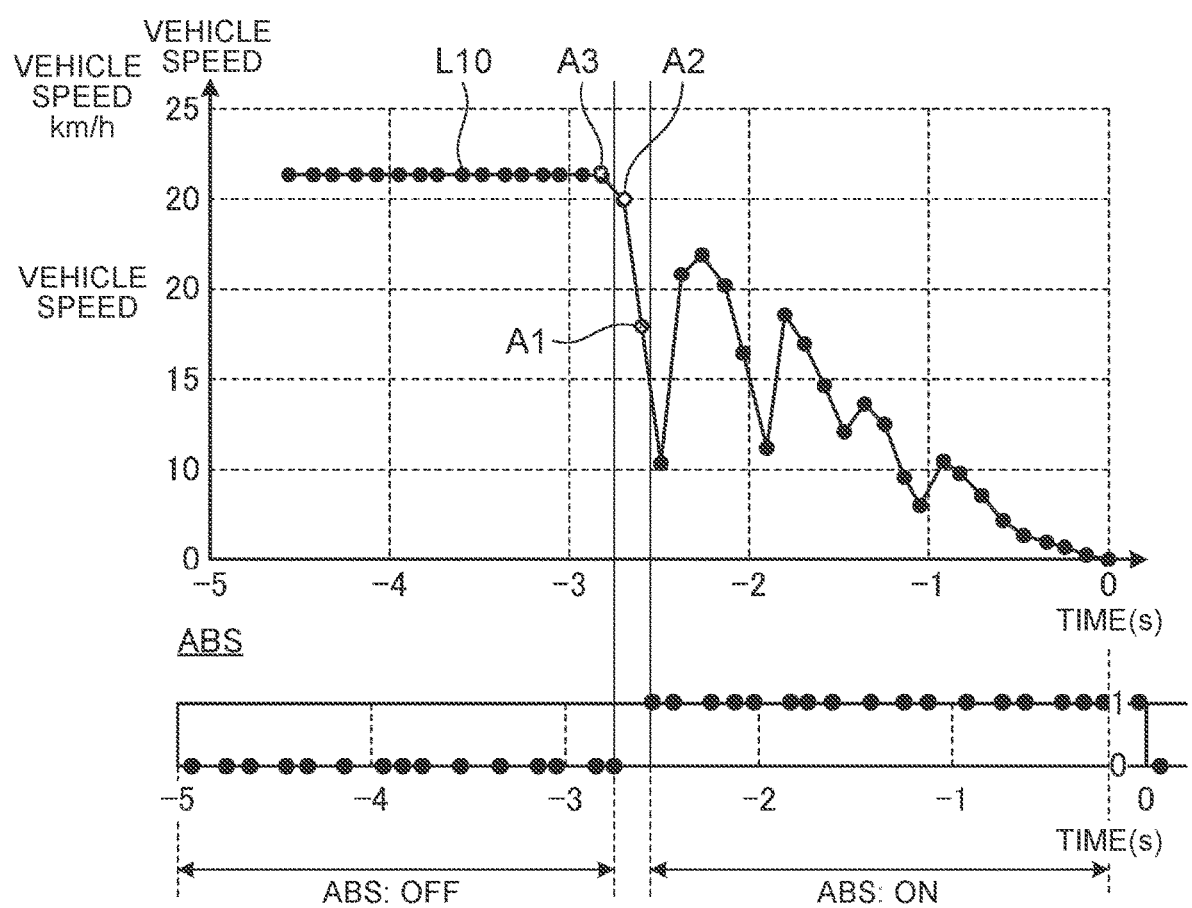

| | $R^2$ | EVALUATION |
|---|---|---|
| METHOD 1 | 0.7933 | △ DEEMED SPEED DURING TIRE LOCK |
| METHOD 2 | 0.8181 | ○ OPTIMUM AS SPEED WHEN SLIP HAS OCCURRED |
| METHOD 3 | 0.8022 | ○ INCLUDING DATA WITH UNUSED COEFFICIENT OF SLIDING FRICTION $\mu$ |

| | VARIANCE | STANDARD DEVIATION |
|---|---|---|
| METHOD 1 | 0.0016 | 0.040 |
| METHOD 2 | 0.0012 | 0.035 |
| METHOD 3 | 0.0016 | 0.040 |

FIG. 14

| | $R^2$ | VARIANCE | STANDARD DEVIATION | EVALUATION |
|---|---|---|---|---|
| METHOD 1 | 0.7933 | 0.0016 | 0.040 | △ |
| METHOD 2 | 0.8181 | 0.0012 | 0.035 | ○ |
| METHOD 3 | 0.8022 | 0.0016 | 0.040 | △ |

DRIVING ASSISTANCE APPARATUS, DRIVING ASSISTANCE METHOD, AND NON-TRANSITORY STORAGE MEDIUM

CROSS-REFERENCE TO RELATED APPLICATION

This application claims priority to Japanese Patent Application No. 2020-121589 filed on Jul. 15, 2020, incorporated herein by reference in its entirety.

BACKGROUND

1. Technical Field

The present disclosure relates to a driving assistance apparatus, a driving assistance method, and a non-transitory storage medium.

2. Description of Related Art

In Japanese Unexamined Patent Application Publication No. 06-127405 (JP 06-127405 A), when a slipping state of a vehicle is detected, the coefficient of friction of a road where the vehicle is traveling is detected by using an acceleration of the vehicle immediately before the slip detection and an acceleration of the vehicle during the slip detection.

SUMMARY

In JP 06-127405 A, however, the coefficient of friction of the road when the vehicle has slipped is detected alone. Therefore, it is difficult to detect a slip due to road freezing and a slip due to other factors while distinguishing those slips.

The present disclosure provides a driving assistance apparatus, a driving assistance method, and a non-transitory storage medium in which the slip due to the road freezing can be detected.

A first aspect of the present disclosure relates to a driving assistance apparatus. The driving assistance apparatus includes a processor having hardware. The processor is configured to acquire vehicle speed data before an anti-lock braking system (ABS) of a vehicle is activated and vehicle speed data when the ABS of the vehicle is stopped, calculate a coefficient of sliding friction based on the vehicle speed data before the ABS is activated and the vehicle speed data when the ABS is stopped, determine whether the coefficient of sliding friction is equal to or smaller than a threshold, and detect that a slip due to road freezing has occurred when the coefficient of sliding friction is equal to or smaller than the threshold.

In the first aspect, the vehicle speed data before the ABS is activated may be vehicle speed data immediately before the ABS is activated, vehicle speed data that is one period earlier and sampled immediately before the ABS is activated, or last vehicle speed data before the ABS is activated.

In the first aspect, the vehicle speed data before the ABS is activated may be vehicle speed data that is one period earlier and sampled immediately before the ABS is activated.

In the first aspect, the processor may be configured to determine whether an operation period of the ABS is equal to or longer than a predetermined period, and detect that the slip due to the road freezing has occurred when the operation period of the ABS is equal to or longer than the predetermined period.

In the first aspect, the processor may be configured to output, to another vehicle or an external server that records map data, road freezing information indicating a position where the slip has been detected due to the road freezing.

In the first aspect, the processor may be configured to acquire CAN data of the vehicle. The CAN data may contain at least the vehicle speed data before the ABS of the vehicle is activated and the vehicle speed data when the ABS of the vehicle is stopped.

In the first aspect, the CAN data may be acquired at every predetermined time.

A second aspect of the present disclosure relates to a driving assistance method to be executed by a driving assistance apparatus including a processor having hardware. The driving assistance method includes acquiring vehicle speed data before an ABS of a vehicle is activated and vehicle speed data when the ABS of the vehicle is stopped, calculating a coefficient of sliding friction based on the vehicle speed data before the ABS is activated and the vehicle speed data when the ABS is stopped, determining whether the coefficient of sliding friction is equal to or smaller than a threshold, and detecting that a slip due to road freezing has occurred when the coefficient of sliding friction is equal to or smaller than the threshold.

In the second aspect, the vehicle speed data before the ABS is activated may be vehicle speed data immediately before the ABS is activated, vehicle speed data that is one period earlier and sampled immediately before the ABS is activated, or last vehicle speed data before the ABS is activated.

In the second aspect, the vehicle speed data before the ABS is activated may be vehicle speed data that is one period earlier and sampled immediately before the ABS is activated.

In the second aspect, the driving assistance method may include determining whether an operation period of the ABS is equal to or longer than a predetermined period, and detecting that the slip due to the road freezing has occurred when the operation period of the ABS is equal to or longer than the predetermined period.

In the second aspect, the driving assistance method may include outputting, to another vehicle or an external server that records map data, road freezing information indicating a position where the slop has been detected due to the road freezing.

In the second aspect, the driving assistance method may include acquiring CAN data of the vehicle. The CAN data may contain at least the vehicle speed data before the ABS of the vehicle is activated and the vehicle speed data when the ABS of the vehicle is stopped.

In the second aspect, the driving assistance method may include acquiring the CAN data at every predetermined time.

A third aspect of the present disclosure relates to a non-transitory storage medium storing instructions that are executable by one or more processors having hardware and that cause the one or more processors to perform functions. The functions include acquiring vehicle speed data before an ABS of a vehicle is activated and vehicle speed data when the ABS of the vehicle is stopped, calculating a coefficient of sliding friction based on the vehicle speed data before the ABS is activated and the vehicle speed data when the ABS is stopped, determining whether the coefficient of sliding friction is equal to or smaller than a threshold, and detecting that a slip due to road freezing has occurred when the coefficient of sliding friction is equal to or smaller than the threshold.

In the third aspect, the vehicle speed data before the ABS is activated may be vehicle speed data immediately before the ABS is activated, vehicle speed data that is one period earlier and sampled immediately before the ABS is activated, or last vehicle speed data before the ABS is activated.

In the third aspect, the vehicle speed data before the ABS is activated may be vehicle speed data that is one period earlier and sampled immediately before the ABS is activated.

In the third aspect, the functions may include determining whether an operation period of the ABS is equal to or longer than a predetermined period, and detecting, when the operation period of the ABS is equal to or longer than the predetermined period, that the slip due to the road freezing has occurred.

In the third aspect, the functions may include outputting, to another vehicle or an external server that records map data, road freezing information indicating a position where the slip has been detected due to the road freezing.

In the third aspect, the functions may include acquiring CAN data of the vehicle. The CAN data may contain at least the vehicle speed data before the ABS of the vehicle is activated and the vehicle speed data when the ABS of the vehicle is stopped.

According to the first aspect, the second aspect, and the third aspect of the present disclosure, the slip due to the road freezing and the slip due to other factors can be detected while being distinguished from each other.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram illustrating a relationship between a visually observed road category and a coefficient of sliding friction;

FIG. 8 is a diagram schematically illustrating sampling periods of ABS data and vehicle speed data;

FIG. 14 is a diagram illustrating the methods, the determination coefficients $R^2$, the variances, the standard deviations, and evaluations;

DETAILED DESCRIPTION OF EMBODIMENTS

Driving assistance systems according to embodiments of the present disclosure are described below with reference to the drawings. The present disclosure is not limited to the following embodiments. In the following description, the same parts are represented by the same reference symbols.

First Embodiment

Overview of Driving Assistance System

Figure 1:
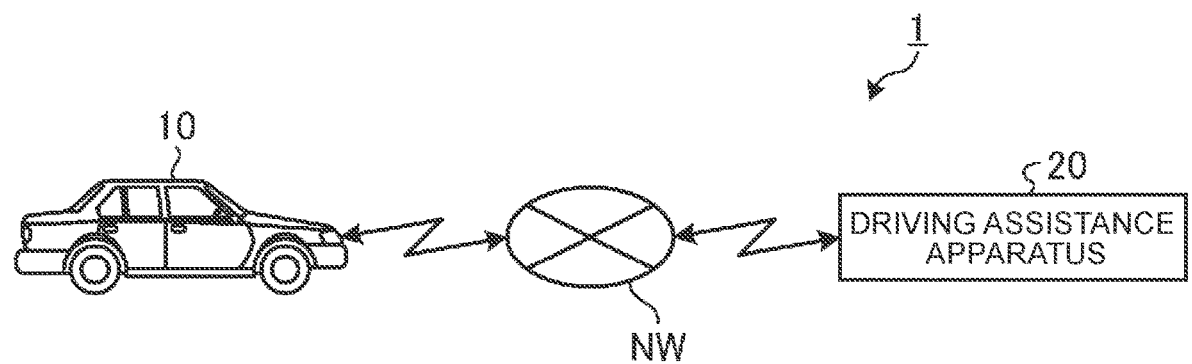
FIG. 1 is a diagram schematically illustrating the configuration of a driving assistance system according to a first embodiment.

FIG. 1 is a diagram schematically illustrating the configuration of a driving assistance system according to a first embodiment. The driving assistance system 1 illustrated in FIG. 1 includes a vehicle 10 and a driving assistance apparatus 20. The vehicle 10 and the driving assistance apparatus 20 are communicable with each other via a network NW. For example, the network NW is constituted by the Internet and a mobile phone network. In the driving assistance system 1, a plurality of vehicles 10 transmits controller area network (CAN) data to the driving assistance apparatus 20 via the network NW at predetermined time intervals (for example, at intervals of 10 msec). The CAN data contains traveling condition data related to traveling of the vehicles 10. The driving assistance system 1 calculates a coefficient of sliding friction of a road where the vehicle 10 is traveling based on vehicle speed data before an anti-lock braking system (ABS) of the vehicle 10 is activated and vehicle speed data when the ABS of the vehicle 10 is stopped. Those pieces of vehicle speed data are contained in the CAN data transmitted from the vehicles 10 at the predetermined time intervals. In the driving assistance system 1, the driving assistance apparatus 20 determines whether the coefficient of sliding friction of the road where the vehicle 10 is traveling is equal to or smaller than a threshold. When determination is made that the coefficient of sliding friction of the road where the vehicle 10 is traveling is equal to or smaller than the threshold, the driving assistance system 1 detects that a slip due to road freezing has occurred on the road where the vehicle 10 is traveling.

Configuration of Vehicle

Figure 2:
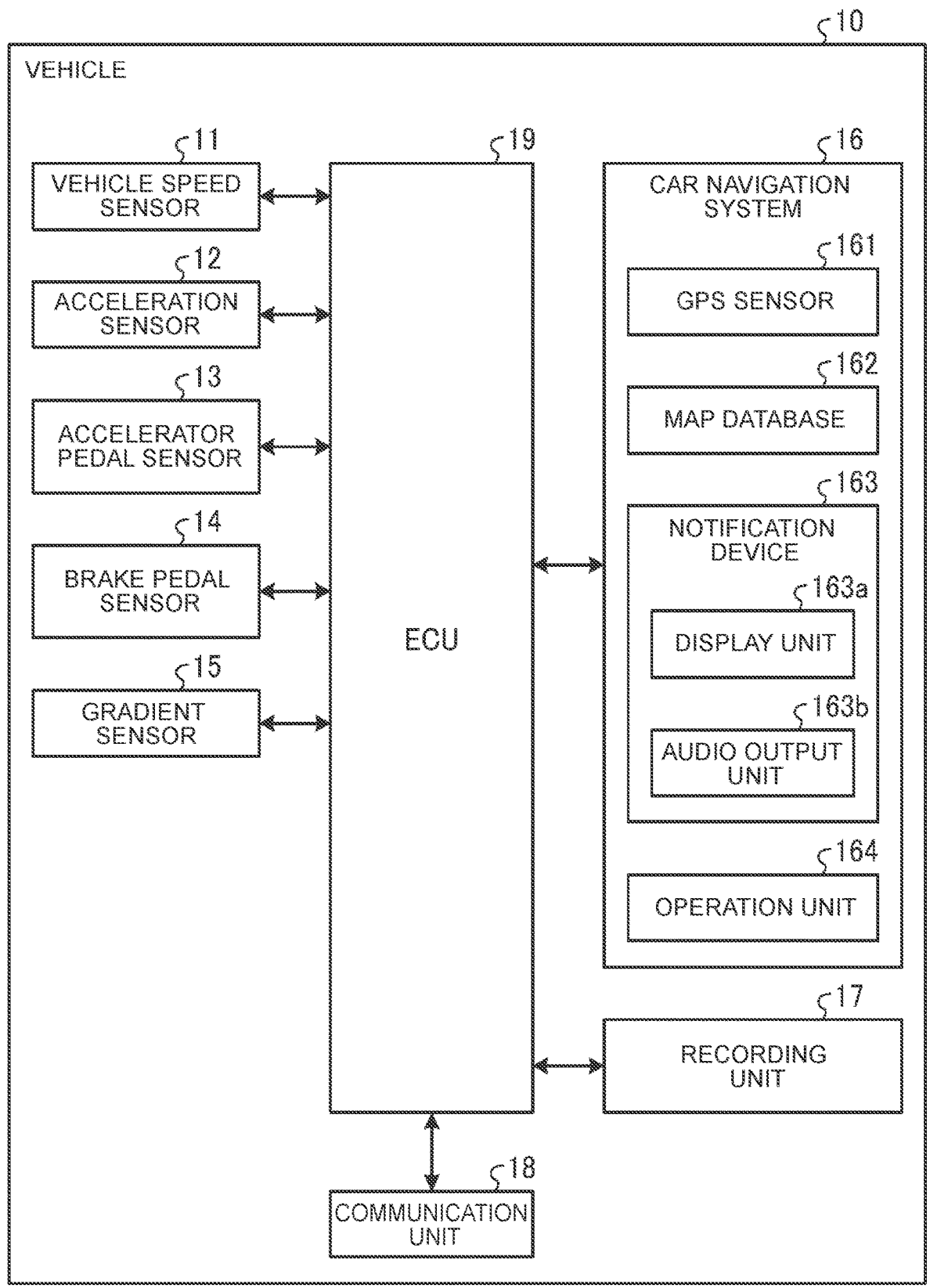
FIG. 2 is a block diagram illustrating the functional configuration of a vehicle according to the first embodiment.

First, the functional configuration of the vehicle 10 is described. FIG. 2 is a block diagram illustrating the functional configuration of the vehicle 10.

The vehicle 10 illustrated in FIG. 2 includes a vehicle speed sensor 11, an acceleration sensor 12, an accelerator pedal sensor 13, a brake pedal sensor 14, a gradient sensor 15, a car navigation system 16, a recording unit 17, a communication unit 18, and an electronic control unit (ECU) 19. In the following description, the vehicle 10 is an automobile, but is not limited to the automobile. For example, the vehicle 10 may also be a bus or a truck.

The vehicle speed sensor 11 detects a traveling speed (measured speed) of the traveling vehicle 10, and outputs the detection result to the ECU 19.

The acceleration sensor 12 detects an acceleration of the vehicle 10, and outputs the detection result to the ECU 19.

The accelerator pedal sensor 13 detects an amount of depression of an accelerator pedal by a user, and outputs the detection result to the ECU 19.

The brake pedal sensor 14 detects an amount of depression of a brake pedal by the user, and outputs the detection result to the ECU 19.

The gradient sensor 15 detects a tilt of the vehicle 10 (gradient of a road where the vehicle 10 is traveling) with respect to a horizontal line, and outputs the detection result to the ECU 19.

The car navigation system 16 includes a global positioning system (GPS) sensor 161, a map database 162, a notification device 163, and an operation unit 164.

The GPS sensor 161 receives signals from a plurality of GPS satellites or transmission antennas, and calculates a position (longitude and latitude) of the vehicle 10 based on the received signals. The GPS sensor 161 is a GPS reception sensor or the like. In the first embodiment, a plurality of GPS sensors 161 may be mounted to improve the accuracy of the direction of the vehicle 10.

The map database 162 records various types of map data. The map database 162 is implemented by using a recording medium such as a hard disk drive (HDD) or a solid state drive (SSD).

The notification device 163 includes a display unit 163a and an audio output unit 163b. The display unit 163a displays image, map, video, and text information. The audio output unit 163b generates sounds such as a voice and an alert sound. The display unit 163a is implemented by using a liquid crystal or organic electroluminescence (EL) display or the like. The audio output unit 163b is implemented by using a loudspeaker or the like.

The operation unit 164 receives an input of user's operations, and outputs signals to the ECU 19 based on details of various received operations. The operation unit 164 is implemented by using a touch panel, buttons, switches, a jog dial, or the like.

In the car navigation system 16 having the configuration described above, a current position of the vehicle 10 that is acquired by the GPS sensor 161 is superposed on a map corresponding to map data recorded in the map database 162. The display unit 163a and the audio output unit 163b notify the user about information including, for example, a road where the vehicle 10 is currently traveling and a route to a destination.

The recording unit 17 records various types of information related to the vehicle 10. For example, the recording unit 17 records CAN data of the vehicle 10 that is input from the ECU 19 and various programs to be executed by the ECU 19. The recording unit 17 is implemented by using a dynamic random access memory (DRAM), a read only memory (ROM), a flash memory, a hard disk drive (HDD), a solid state drive (SSD), or the like.

The communication unit 18 transmits CAN data and the like to the driving assistance apparatus 20 via the network NW under control of the ECU 19. The communication unit 18 communicates with other vehicles via the network NW, and receives various types of information. The communication unit 18 is implemented by using, for example, a communication module configured to transmit and receive various types of information.

The ECU 19 is implemented by using a memory and a processor having hardware such as a central processing unit (CPU). The ECU 19 controls individual portions of the vehicle 10. The ECU 19 causes the communication unit 18 to transmit CAN data of the vehicle 10. The CAN data contains traveling condition data such as a traveling speed (measured speed), an acceleration, an amount of depression of the accelerator pedal, an amount of depression of the brake pedal, a tilt of the vehicle 10, a time when the ABS of the vehicle 10 is driven, a time when the ABS of the vehicle 10 is stopped, an operation period of the ABS of the vehicle 10, vehicle speed data before the ABS of the vehicle 10 is activated, and vehicle speed data when the ABS of the vehicle 10 is stopped, information on a time when the traveling condition data is detected, positional information (longitude-and-latitude information) of the vehicle 10, positional information when the ABS of the vehicle 10 is activated, vehicle type information of the vehicle 10, and identification information for identifying the vehicle 10 (vehicle ID). The CAN data may also contain, for example, image data generated by an imaging device provided on the vehicle 10. The vehicle speed data before the ABS of the vehicle 10 is activated is vehicle speed data immediately before the ABS of the vehicle 10 is activated, vehicle speed data that is one period earlier and sampled immediately before the ABS of the vehicle 10 is activated, or the last vehicle speed data before the ABS of the vehicle 10 is activated. Details of the vehicle speed data before the ABS of the vehicle 10 is activated are described later.

Configuration of Driving Assistance Apparatus

Figure 3:
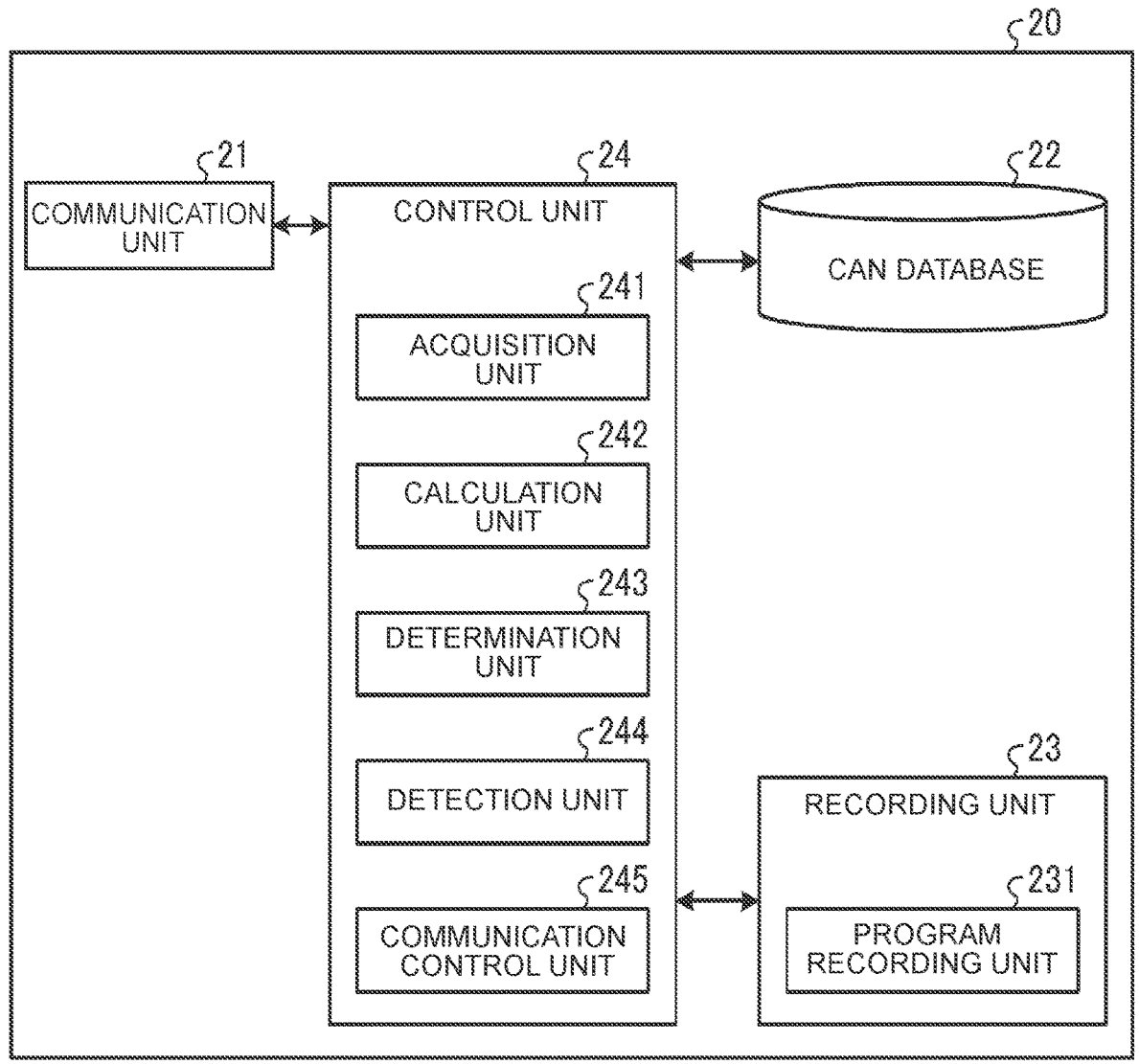
FIG. 3 is a block diagram illustrating the functional configuration of a driving assistance apparatus 20 according to the first embodiment.

Next, the functional configuration of the driving assistance apparatus 20 is described. FIG. 3 is a block diagram illustrating the functional configuration of the driving assistance apparatus 20.

The driving assistance apparatus 20 illustrated in FIG. 3 includes a communication unit 21, a CAN database 22, a recording unit 23, and a control unit 24.

The communication unit 21 receives CAN data from each of the vehicles 10 via the network NW and outputs the received CAN data to the control unit 24 under control of the control unit 24. The communication unit 21 transmits road freezing information to the vehicle 10 or an external server that records map data via the network NW under control of the control unit 24. The road freezing information indicates a position where a slip of the vehicle 10 due to road freezing has occurred. The communication unit 21 is implemented by using, for example, a communication module configured to receive various types of information. Details of the road freezing information are described later.

The CAN database 22 records pieces of CAN data of the vehicles 10 that are input from the control unit 24. The CAN database 22 is implemented by using a hard disk drive (HDD), a solid state drive (SSD), or the like.

For example, the recording unit 23 records various types of information on the driving assistance apparatus 20 and data under processing. The recording unit 23 includes a program recording unit 231 that records various programs to be executed by the driving assistance apparatus 20. The recording unit 23 is implemented by using a dynamic random access memory (DRAM), a read only memory (ROM), a flash memory, an HDD, an SSD, or the like.

The control unit 24 controls individual portions of the driving assistance apparatus 20. The control unit 24 is implemented by using a memory and a processor having hardware such as a graphics processing unit (GPU), a field-programmable gate array (FPGA), or a CPU. The control unit 24 includes an acquisition unit 241, a calculation unit 242, a determination unit 243, a detection unit 244, and a communication control unit 245.

The acquisition unit 241 acquires CAN data from the vehicle 10 via the communication unit 21, and records the acquired CAN data in the CAN database 22.

The calculation unit 242 calculates a coefficient of sliding friction based on vehicle speed data before the ABS is activated and vehicle speed data when the ABS is stopped in the CAN data recorded in the CAN database 22.

The determination unit 243 determines whether the coefficient of sliding friction calculated by the calculation unit 242 is equal to or smaller than a threshold. Specifically, the determination unit 243 determines whether the coefficient of sliding friction (road μ) calculated by the calculation unit 242 is equal to or smaller than the threshold (for example, equal to or smaller than 0.3).

The detection unit 244 detects that a slip due to road freezing has occurred when the determination unit 243 determines that the coefficient of sliding friction calculated by the calculation unit 242 is equal to or smaller than the threshold.

The communication control unit 245 outputs, to other vehicles or the external server that records map data, road freezing information indicating a position of the slip due to the road freezing that is detected by the detection unit 244.

Coefficient of Sliding Friction

Figure 4:
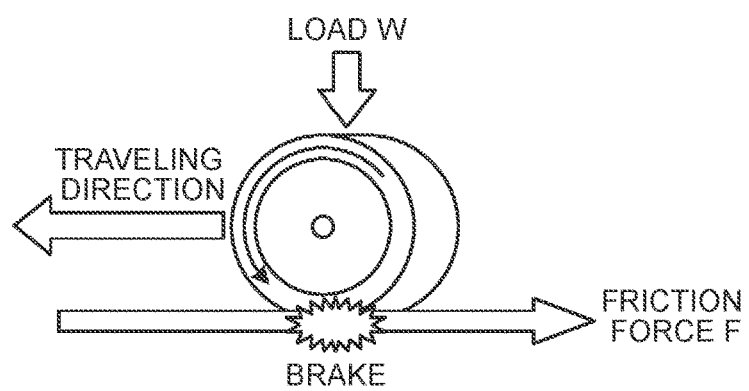
FIG. 4 is a schematic diagram of sliding friction.

Next, the coefficient of sliding friction is described. FIG. 4 is a schematic diagram of sliding friction. FIG. 5 is a diagram illustrating a relationship between a visually observed road category and the coefficient of sliding friction. In FIG. 5, measurement conditions are such that standard tires for winter road investigation are used, the tire size is 165/80R13, the tire pressure is 1.9 kgf/cm$^2$, and the load is set to 400 kgf. In FIG. 5, values are determined by measuring negative accelerations (decelerations) when the vehicle 10 traveling at a constant speed is harshly braked and wheels are locked and slipping on a road.

As illustrated in FIG. 4, the coefficient of sliding friction μ is a value obtained by dividing a resistance force acting between substances (friction force F) by a load W (coefficient of sliding friction μ=friction force F/load W), and is an index of slippage. As the coefficient of sliding friction μ is closer to "0", the slippage increases. As the coefficient of sliding friction μ is closer to "1", the slippage decreases. The coefficient of sliding friction μ changes depending on, for example, tire conditions, road conditions, and braking conditions.

Specifically, the coefficient of sliding friction μ used in the Road Construction Ordinance is 0.33 to 0.38 as an index in wet conditions and uniformly 0.15 on snowy and icy roads at a traveling speed of 40 to 60 km/h. As shown in a table T1 of FIG. 5, the slippage of snowy and icy roads in winter is indicated by the coefficient of sliding friction μ that falls within a range of about 0.10 to 0.30. On a slippery road, an acceleration (deceleration) immediately after harsh braking is low. On a non-slippery road, the acceleration (deceleration) immediately after harsh braking is high. When $V_2$ represents vehicle speed data when the ABS is stopped, $V_1$ represents vehicle speed data before the ABS is activated, $T_1$ represents a time when the ABS is stopped, and $T_2$ represents a time before the ABS is activated, the coefficient of sliding friction μ has, as in Expression (1), a relationship in which the coefficient of sliding friction μ is equal to a value obtained by dividing a measured acceleration (deceleration) by a gravitational acceleration "g".

$$\text{Coefficient of sliding friction } \mu \text{ (acceleration)} = -1/g \cdot (V_2-V_1)/(T_2-T_1) \quad (1)$$

When the coefficient of sliding friction μ is equal to or smaller than the threshold (for example, equal to or smaller than 0.30) at the time of operation of the ABS of the vehicle 10 (immediately after harsh braking), a slip due to road freezing may occur. To detect slip behavior of the vehicle 10 due to the road freezing, the inventors have focused on the coefficient of sliding friction μ equivalent to the acceleration (acceleration coefficient of sliding friction), and found that the slip of the vehicle 10 due to the road freezing can be detected by calculating the acceleration (coefficient of sliding friction μ).

Figure 6:
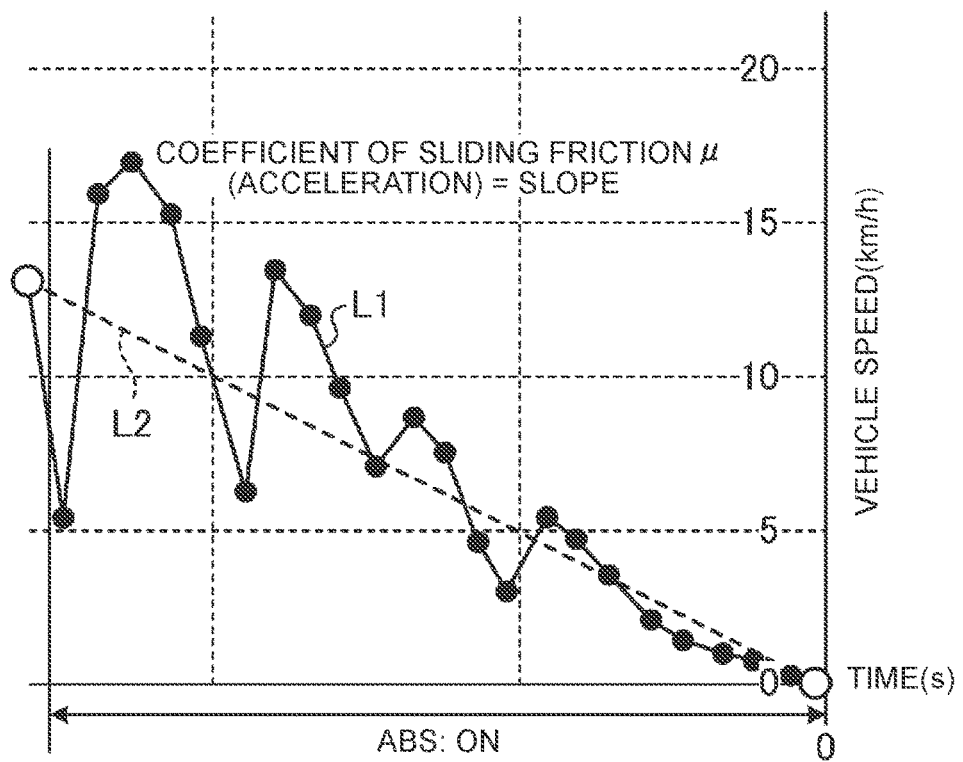
FIG. 6 is a diagram illustrating a relationship between time and a speed immediately before an ABS is activated.
Figure 7:
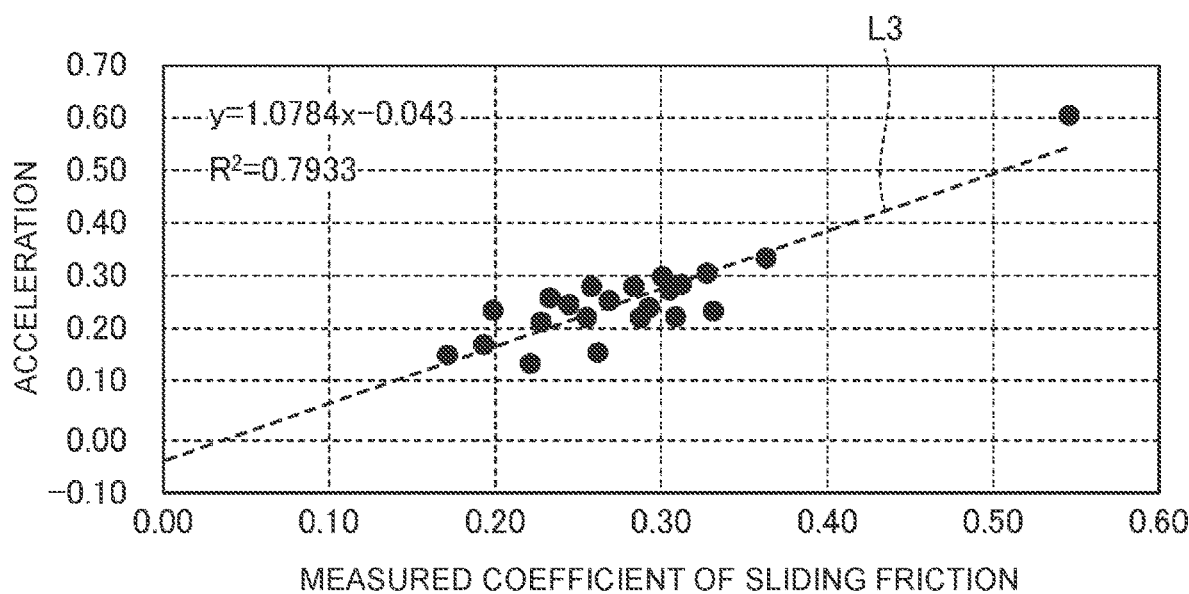
FIG. 7 is a diagram illustrating a correlation between an acceleration and the coefficient of sliding friction.

Correlation Between Slip Behavior and Vehicle Speeds Before and After Start of Operation of ABS Next, description is given of a correlation between slip behavior and vehicle speeds before and after the start (end) of operation of the ABS of the vehicle 10. FIG. 6 is a diagram illustrating a relationship between time and a speed immediately before the ABS is activated. FIG. 7 is a diagram illustrating a correlation between the acceleration and the coefficient of sliding friction. In FIG. 6, the horizontal axis represents time (s), and the vertical axis represents a vehicle speed (km/h). In FIG. 6, a line graph L1 indicates a change in the vehicle speed at each sampling, and a straight line L2 indicates a change in the vehicle speed at each sampling that is approximated by the straight line. In FIG. 7, the horizontal axis represents a measured value of the coefficient of sliding friction, and the vertical axis represents an acceleration. A straight line L3 is a regression line between the acceleration and the coefficient of sliding friction.

As illustrated in FIG. 6 and FIG. 7, a determination coefficient $R^2$ is calculated to be 0.7933 ($R^2$=0.7933) when a model calculated by approximation in FIG. 6 (y=1.0784x−0.043) is used. In general, determination can be made that the correlation is strong when the determination coefficient $R^2$ is equal to or larger than 0.7 (<*>0≤$R^2$≤1).

As described above, the driving assistance apparatus 20 calculates the acceleration as the coefficient of sliding friction μ a based on the vehicle speed data before the ABS of the vehicle 10 is activated and the vehicle speed data when the ABS of the vehicle 10 is stopped, and determines whether the coefficient of sliding friction μ is equal to or smaller than the threshold, for example, equal to or smaller than 0.3 (see the table T1 of FIG. 5). When the coefficient of sliding friction μ is equal to or smaller than the threshold, the driving assistance apparatus 20 detects that the slip due to the road freezing has occurred on the road where the vehicle 10 has traveled.

Verification of Timing to Acquire Vehicle Speed Data

Next, a timing to acquire the vehicle speed data is described. Immediately after the vehicle 10 is braked, it is difficult to acquire reliable vehicle speed data because the tires are locked. Further, sampling periods of ABS data (data before and after the start and end of operation of the ABS) and the vehicle speed data have variations. In the first embodiment, verification is made by calculating determination coefficients $R^2$ on individual pieces of vehicle speed data as to whether the use of the vehicle speed data immediately before the ABS is activated, the vehicle speed data that is one period earlier and sampled immediately before the ABS is activated, or the last vehicle speed data before the ABS is activated as the vehicle speed data before the ABS is activated is optimum.

FIG. 8 is a diagram schematically illustrating the sampling periods of the ABS data and the vehicle speed data. An upper graph of FIG. 8 shows a vehicle speed, and a lower graph of FIG. 8 shows an ABS operation timing. In the upper and lower graphs of FIG. 8, the horizontal axis represents time (s). In the upper graph of FIG. 8, the vertical axis represents the vehicle speed (km/h). Regarding the sampling period (msec) in the upper graph of FIG. 8, a maximum value is 140, a minimum value is 90, and an average is 114. Regarding the sampling period (msec) in the lower graph of FIG. 8, a maximum value is 210, a minimum value is 90, and an average is 150. In FIG. 8, a point A1 indicates the vehicle speed data immediately before the ABS of the vehicle 10 is activated, a point A2 indicates the vehicle speed data that is one period earlier and sampled immediately before the ABS of the vehicle 10 is activated, and a point A3 indicates the last vehicle speed data before the ABS of the vehicle 10 is activated.

As shown in the upper and lower graphs of FIG. 8, the sampling periods of the ABS data (data before and after the start and end of operation of the ABS) and the vehicle speed data have variations. In the following description, Method 1 is a method for calculating the coefficient of sliding friction μ by using the vehicle speed data immediately before the ABS is activated (immediately before the ABS is turned ON), Method 2 is a method for calculating the coefficient of sliding friction μ by using the vehicle speed data that is one period earlier and sampled immediately before the ABS is activated, and Method 3 is a method for calculating the coefficient of sliding friction μ by using the last vehicle speed data before the ABS is activated (last vehicle speed data when the ABS is OFF). The verification is made by calculating determination coefficients $R^2$ in the individual methods.

Figure 9A:
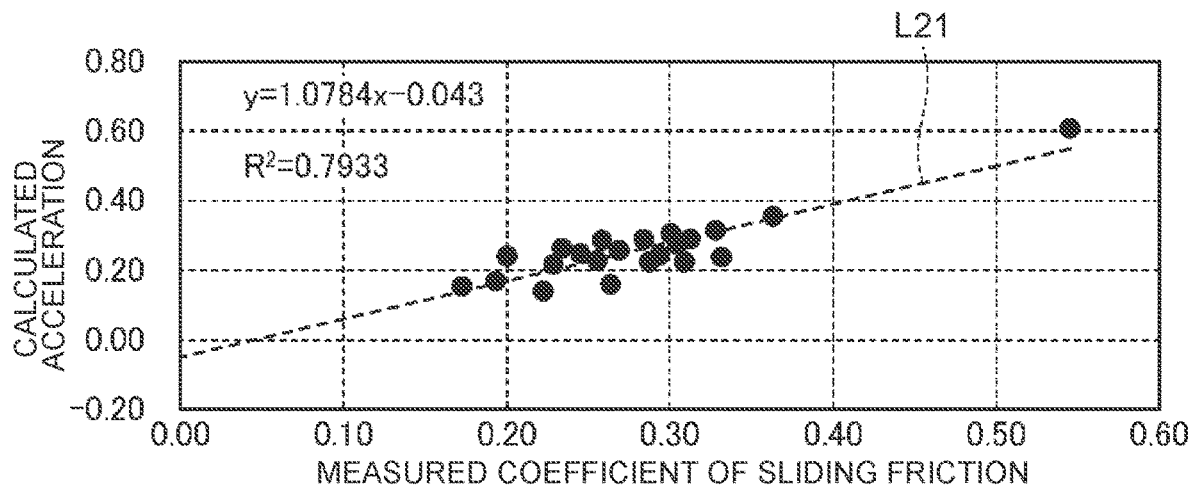
FIG. 9A is a diagram illustrating a correlation between the acceleration and the coefficient of sliding friction in Method 1.
Figure 9B:
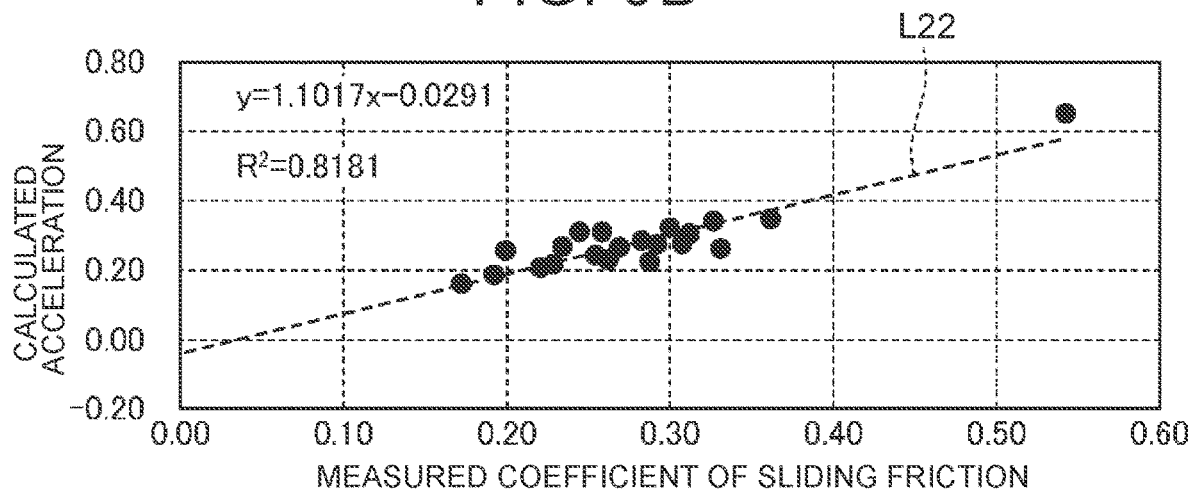
FIG. 9B is a diagram illustrating a correlation between the acceleration and the coefficient of sliding friction in Method 2.
Figure 9C:
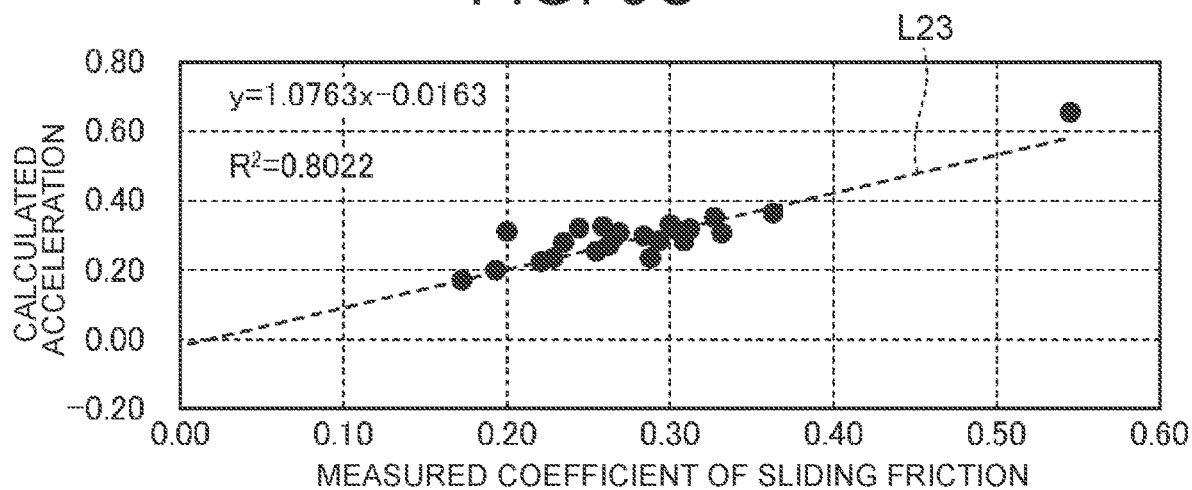
FIG. 9C is a diagram illustrating a correlation between the acceleration and the coefficient of sliding friction in Method 3.
Figures 10, 11:
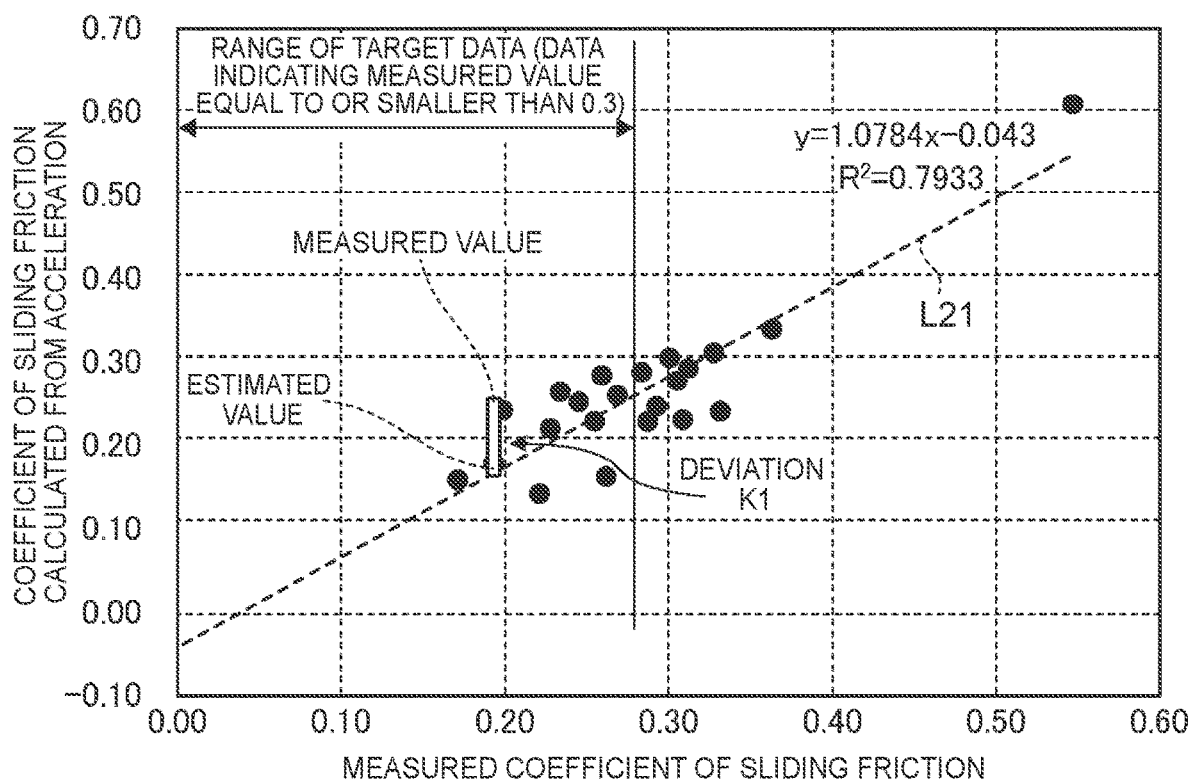
FIG. 10 is a diagram illustrating the methods, determination coefficients $R^2$, and evaluations.
FIG. 11 is a diagram illustrating a relationship between a coefficient of sliding friction calculated from the acceleration and a measured value of the coefficient of sliding friction.

FIG. 9A is a diagram illustrating a correlation between the acceleration and the coefficient of sliding friction in Method 1. FIG. 9B is a diagram illustrating a correlation between the acceleration and the coefficient of sliding friction in Method 2. FIG. 9C is a diagram illustrating a correlation between the acceleration and the coefficient of sliding friction in Method 3. FIG. 10 is a diagram illustrating the methods, the determination coefficients $R^2$, and evaluations. In FIG. 9A to FIG. 9C, the horizontal axis represents a measured value of the coefficient of sliding friction, and the vertical axis represents an acceleration. In FIG. 9A to FIG. 9C, a straight line L21 to a straight line L23 are regression lines between the acceleration and the coefficient of sliding friction.

As shown in FIG. 9A to FIG. 9C and in a table T2 of FIG. 10, when determining optimum vehicle speed data by referring to the determination coefficients $R^2$ based on the accelerations (estimated accelerations) in Method 1 to Method 3, the determination coefficient $R^2$ is largest in Method 2 and smallest in Method 1. In any method, determination can be made that the correlation is strong because the determination coefficient $R^2$ is equal to or larger than 0.7.

Comparison of Estimation Accuracies of Individual Methods

Figures 12, 13:
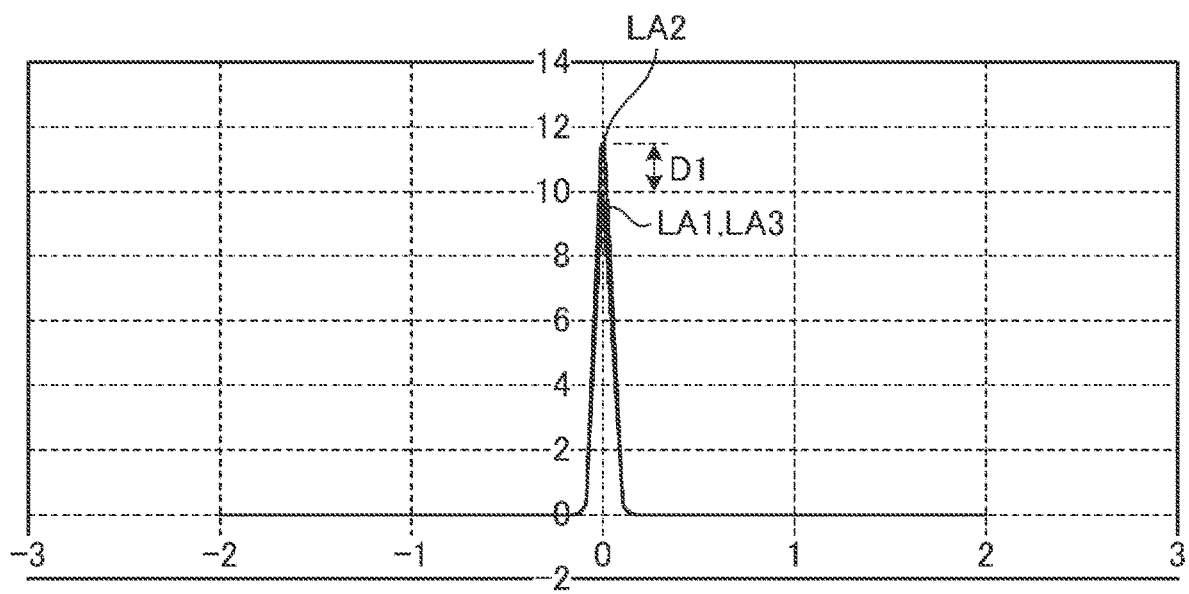
FIG. 12 is a diagram illustrating relationships among the methods, variances, and standard deviations.
FIG. 13 is a diagram illustrating normal distribution graphs of the individual methods.

Next, estimation accuracies of the individual methods are described. FIG. 11 is a diagram illustrating a relationship between the coefficient of sliding friction calculated from the acceleration and the measured value of the coefficient of sliding friction. FIG. 12 is a diagram illustrating relationships among the methods, variances, and standard deviations. In FIG. 11, the vehicle speed data in Method 1 is used as an example.

In the first embodiment, as illustrated in FIG. 11, a variance and a standard deviation in Method 1 are calculated for experiment data in which the coefficient of sliding friction μ (road μ) is equal to or smaller than 0.3 (for example, 14 samples in FIG. 11). In the first embodiment, variances and standard deviations are similarly calculated in Method 2 and Method 3. In the first embodiment, it can be presumed that an estimated value close to the measured value can be calculated by Method 2 as shown in a table T3 of FIG. 12.

FIG. 13 is a diagram illustrating normal distribution graphs of the individual methods. FIG. 14 is a diagram illustrating the methods, the determination coefficients $R^2$, the variances, the standard deviations, and evaluations. In FIG. 13, a curve LA2 indicates a normal distribution of Method 2, a curve LA1 indicates a normal distribution of Method 1, and a curve LA3 indicates a normal distribution of Method 3.

As illustrated in FIG. 13, Method 2 has a significant difference D1 (for example, 15%) from Method 1 and Method 3. Therefore, as shown in a table T4 of FIG. 14, the coefficient of sliding friction μ (road μ) in the first embodiment is calculated by Method 2, that is, by using the vehicle speed data that is one period earlier and sampled immediately before the ABS is activated as the vehicle speed data before the ABS is activated (see FIG. 14).

Process to be Executed by Driving Assistance Apparatus

Figure 15:
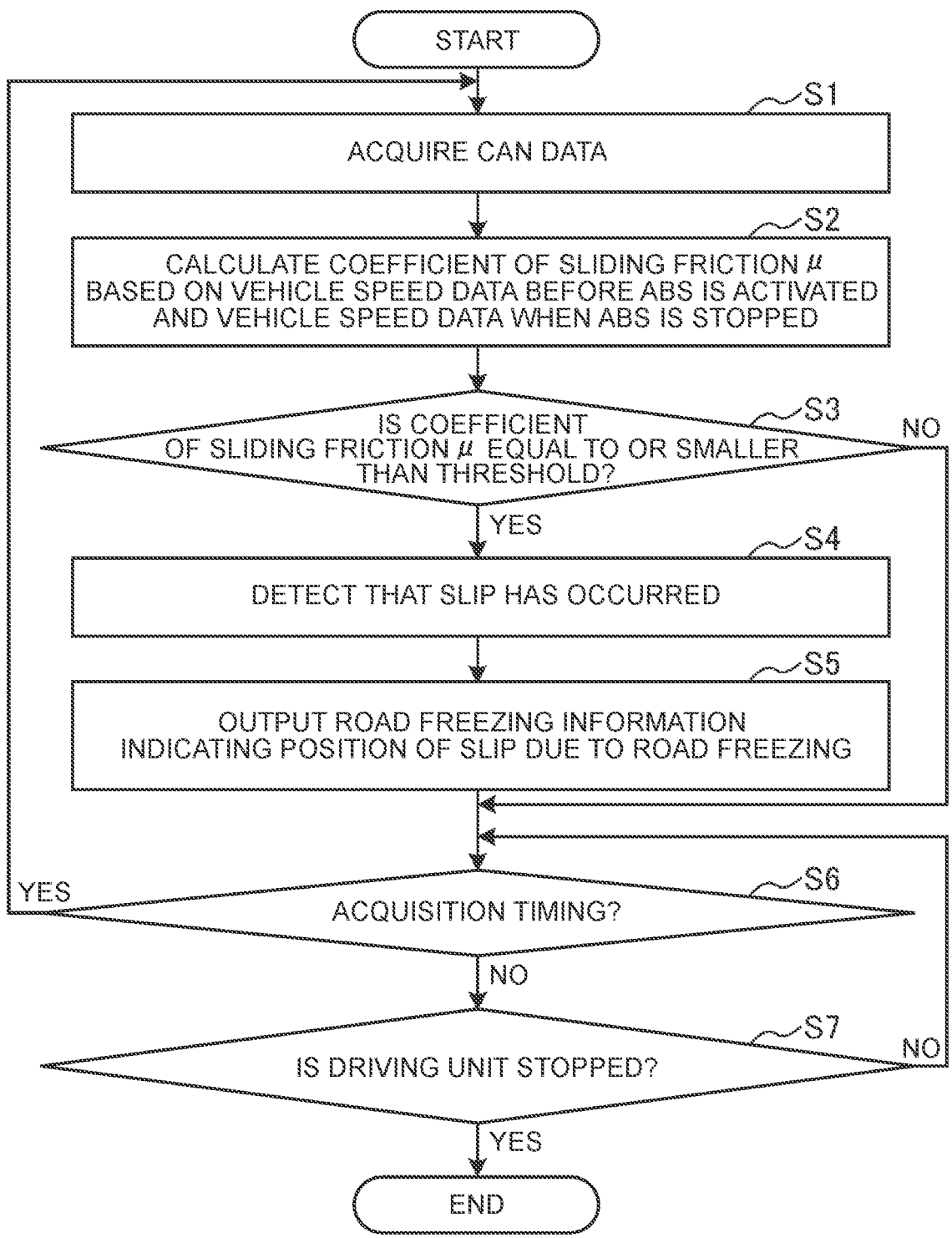
FIG. 15 is a flowchart illustrating an overview of a process to be executed by the driving assistance apparatus according to the first embodiment.

Next, a process to be executed by the driving assistance apparatus 20 is described. FIG. 15 is a flowchart illustrating an overview of the process to be executed by the driving assistance apparatus 20.

As illustrated in FIG. 15, the acquisition unit 241 first acquires CAN data from the vehicle 10 via the communication unit 21 (Step S1).

Subsequently, the calculation unit 242 calculates a coefficient of sliding friction μ based on vehicle speed data before the ABS of the vehicle 10 is activated and vehicle speed data when the ABS of the vehicle 10 is stopped in the CAN data (Step S2).

Then, the determination unit 243 determines whether the coefficient of sliding friction μ calculated by the calculation unit 242 is equal to or smaller than the threshold (Step S3).

When the determination unit 243 determines that the coefficient of sliding friction μ calculated by the calculation unit 242 is equal to or smaller than the threshold (for example, 0.3) (Step S3: Yes), the driving assistance apparatus 20 proceeds to Step S4 described later. When the determination unit 243 determines that the coefficient of sliding friction μ calculated by the calculation unit 242 is not equal to or smaller than the threshold (Step S3: No), the driving assistance apparatus 20 proceeds to Step S6 described later.

In Step S4, the detection unit 244 detects that a slip due to road freezing has occurred when the determination unit 243 determines that the coefficient of sliding friction μ calculated by the calculation unit 242 is equal to or smaller than the threshold (for example, 0.3). In this case, the detection unit 244 extracts, from the CAN data, positional information related to a position where the coefficient of sliding friction μ calculated by the calculation unit 242 is equal to or smaller than the threshold (for example, 0.3) in the determination made by the determination unit 243.

Subsequently, the communication control unit 245 outputs, to the car navigation system 16 of the vehicle 10 or the external server that records map data, road freezing information indicating the position of the slip due to the road freezing that is detected by the detection unit 244 (Step S5). Thus, the car navigation system 16 of the vehicle 10 can display the position of the slip due to the road freezing that is input from the driving assistance apparatus 20 while superposing the position of the slip on a position corresponding to the map data recorded in the map database 162. As a result, users of other vehicles can grasp the position of the slip due to the road freezing. Further, the external server can display the position of the slip due to the road freezing that is input from the driving assistance apparatus 20 at the position corresponding to the map data stored in the map database 162. As a result, a user who accesses the external server by using a mobile phone or the like can grasp the position of the slip due to the road freezing.

Then, the driving assistance apparatus 20 determines whether the timing to acquire CAN data has come (Step S6). When the timing to acquire CAN data has come (Step S6: Yes), the driving assistance apparatus 20 returns to Step S1. When the timing to acquire CAN data has not come (Step S6: No), the driving assistance apparatus 20 proceeds to Step S7.

In Step S7, the driving assistance apparatus 20 determines whether a driving unit of the vehicle 10, such as an engine or a motor, is stopped based on the CAN data (Step S7). When the driving unit of the vehicle 10 is stopped (Step S7: Yes), the process is terminated. When the driving unit of the vehicle 10 is not stopped (Step S7: No), the driving assistance apparatus 20 returns to Step S6.

According to the first embodiment, the control unit 24 acquires the vehicle speed data before the ABS of the vehicle 10 is activated and the vehicle speed data when the ABS of the vehicle 10 is stopped, and calculates the coefficient of sliding friction μ based on the vehicle speed data before the ABS is activated and the vehicle speed data when the ABS is stopped. The control unit 24 determines whether the coefficient of sliding friction μ is equal to or smaller than the threshold. When the coefficient of sliding friction μ is equal to or smaller than the threshold, the control unit 24 detects that the slip due to the road freezing has occurred. Therefore, the slip due to the road freezing can be detected.

According to the first embodiment, the vehicle speed data immediately before the ABS is activated, the vehicle speed data that is one period earlier and sampled immediately before the ABS is activated, or the last vehicle speed data before the ABS is activated is used as the vehicle speed data before the ABS is activated. Therefore, the slip due to the road freezing can be detected accurately.

According to the first embodiment, the vehicle speed data that is one period earlier and sampled immediately before the ABS is activated is used as the vehicle speed data before the ABS is activated. Therefore, the slip due to the road freezing can be detected securely.

According to the first embodiment, the control unit 24 outputs, to other vehicles or the external server that records map data, the road freezing information indicating the position of the detected slip due to the road freezing. Therefore, a user of any other vehicle or a user who accesses the external server can grasp the position of the slip due to the road freezing.

According to the first embodiment, the control unit 24 acquires the CAN data at every predetermined time. Therefore, the position of the slip due to the road freezing can be detected by using the latest data.

In the first embodiment, the vehicle speed data that is one period earlier and sampled immediately before the ABS is activated is used as the vehicle speed data before the ABS is activated, but the vehicle speed data is not limited to this type of data. The position of the slip due to the road freezing may be detected by using the vehicle speed data immediately before the ABS is activated or the last vehicle speed data before the ABS is activated.

Second Embodiment

Next, a second embodiment is described. In the second embodiment, a slip due to road freezing and a slip due to other factors are determined while being distinguished from each other by further using an operation period of the ABS. The same components as those in the driving assistance system 1 according to the first embodiment are represented by the same reference symbols to omit their detailed description.

Correlation Between ABS Operation Period and Coefficient of Sliding Friction

Figure 16:
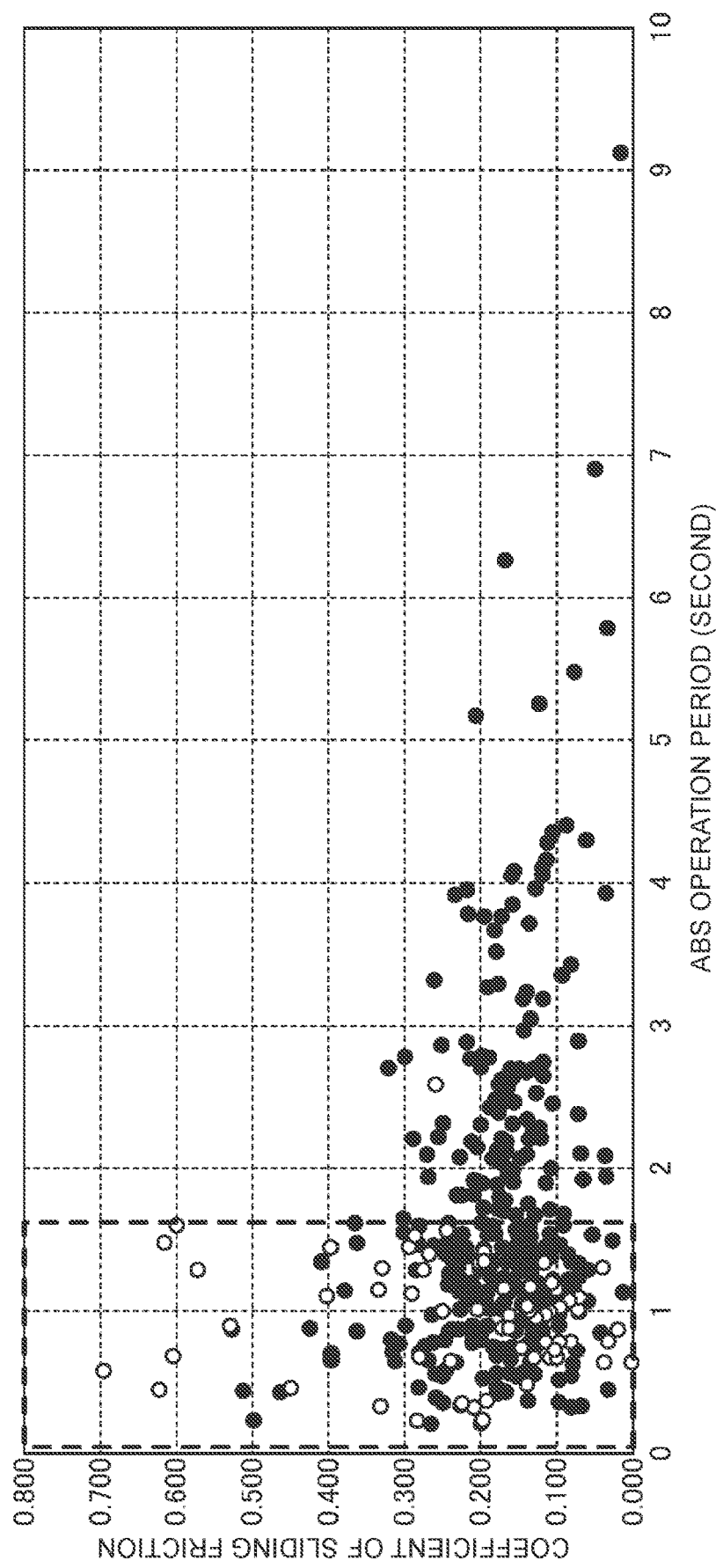
FIG. 16 is a diagram illustrating a relationship between an ABS operation period and the coefficient of sliding friction.
Figure 17:
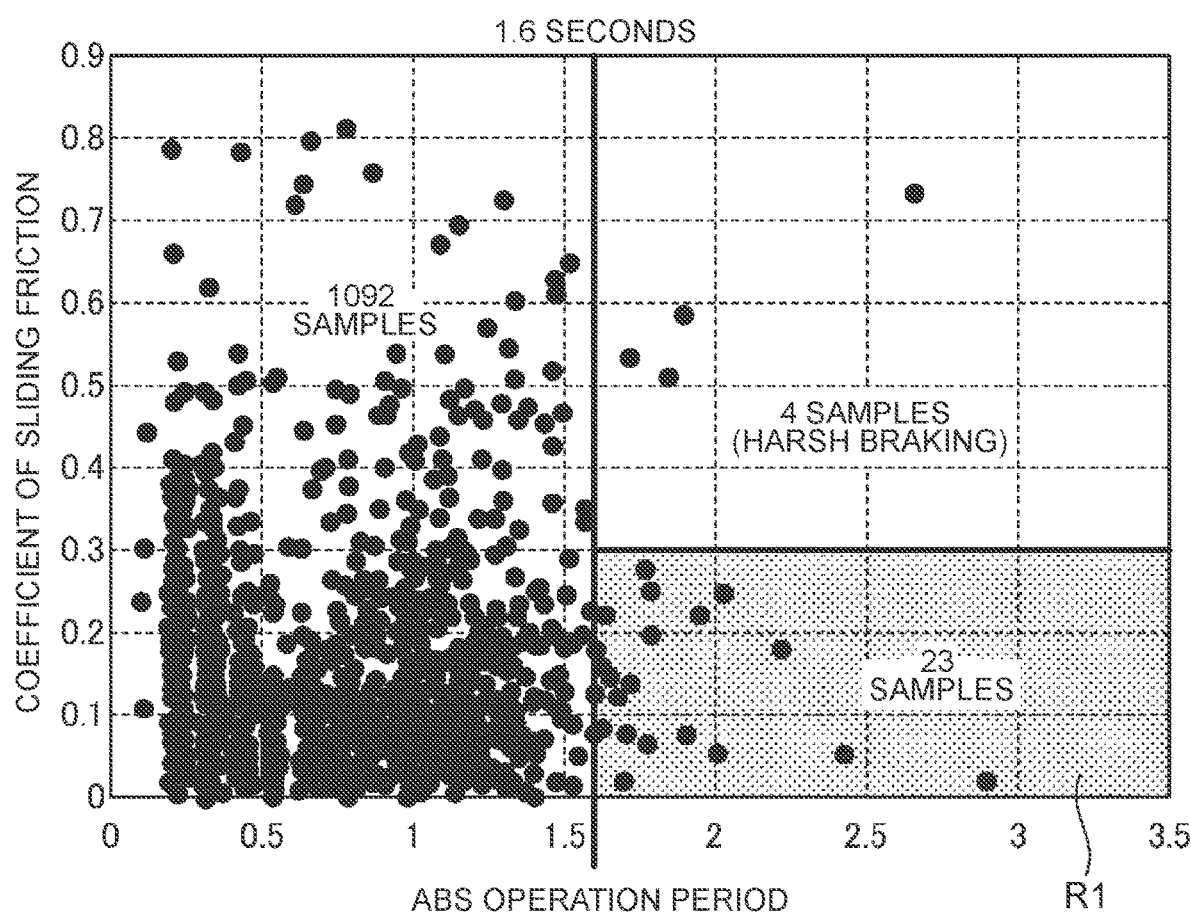
FIG. 17 is a diagram schematically illustrating a state in which the ABS operation period in FIG. 16 is split at a predetermined time.
Figure 18:
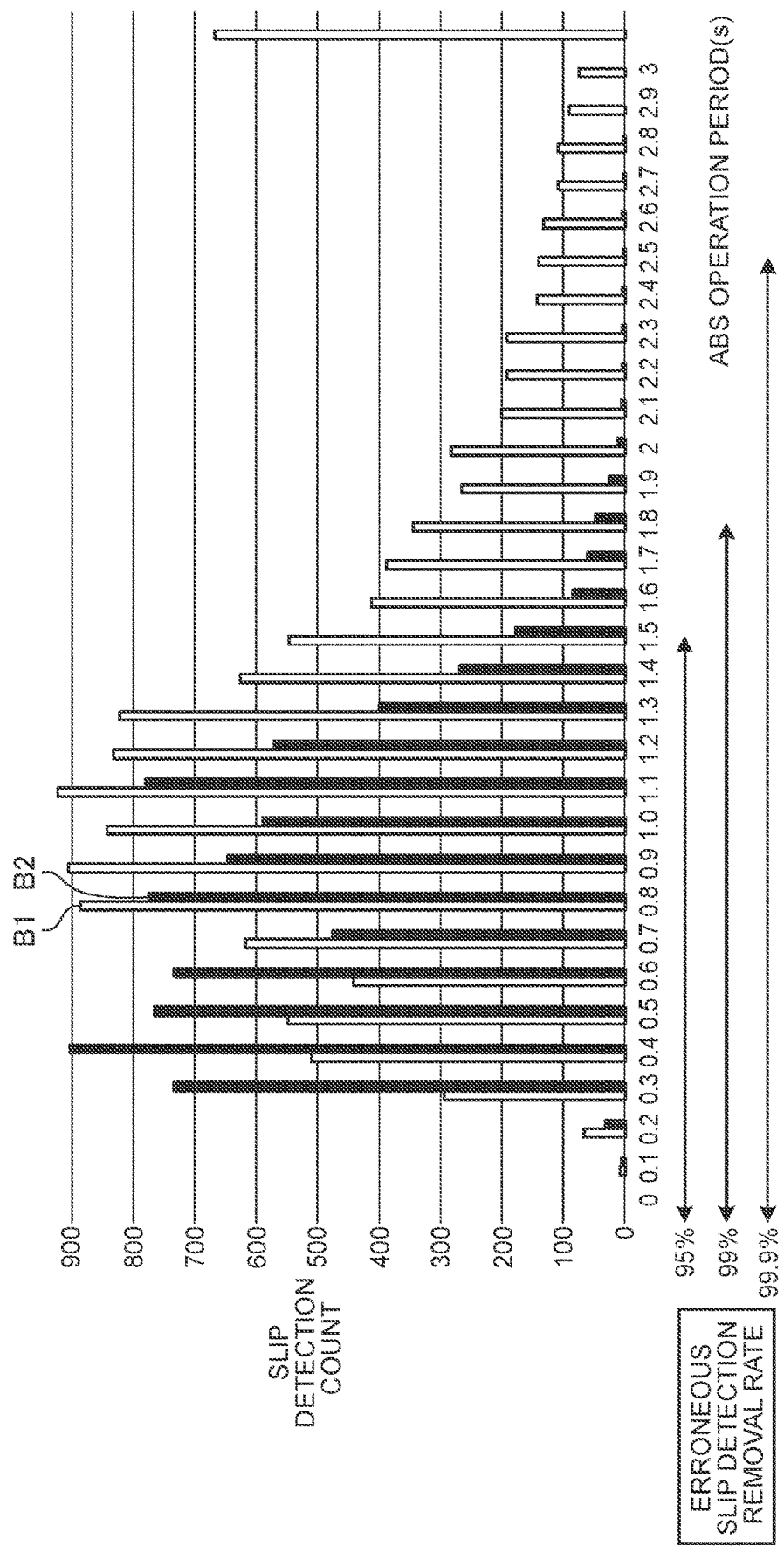
FIG. 18 is a diagram schematically illustrating an erroneous slip detection removal rate extracted by filtering based on the ABS operation period in FIG. 16.

FIG. 16 is a diagram illustrating a relationship between an ABS operation period and the coefficient of sliding friction. FIG. 17 is a diagram schematically illustrating a state in which the ABS operation period in FIG. 16 is split at a predetermined time. FIG. 18 is a diagram schematically illustrating an erroneous slip detection removal rate extracted by filtering based on the ABS operation period in FIG. 16. In FIG. 16 and FIG. 17, the horizontal axis represents an ABS operation period (s), and the vertical axis represents a coefficient of sliding friction (road μ). In FIG. 18, the horizontal axis represents the ABS operation period (s), and the vertical axis represents a slip detection count. In FIG. 18, a bar graph B1 (each white bar graph) shows a count of slips due to road freezing, and a bar graph B2 (each black bar graph) shows a count of slips other than the slips due to the road freezing.

As illustrated in FIG. 16 to FIG. 18, when the ABS operation period is equal to or longer than 1.6 seconds (see a region R1 in FIG. 17), the erroneous slip detection removal rate is equal to or higher than 95%. When the ABS operation period is equal to or longer than 1.8 seconds, the erroneous slip detection removal rate is equal to or higher than 99%. In the second embodiment, when the coefficient of sliding friction μ is equal to or smaller than the threshold, the driving assistance apparatus 20 further determines whether the ABS operation period is equal to or longer than a predetermined period, for example, equal to or longer than 1.6 seconds. When the ABS operation period is equal to or longer than 1.6 seconds, the driving assistance apparatus 20 detects that a slip due to road freezing has occurred.

Process to be Executed by Driving Assistance Apparatus

Figure 19:
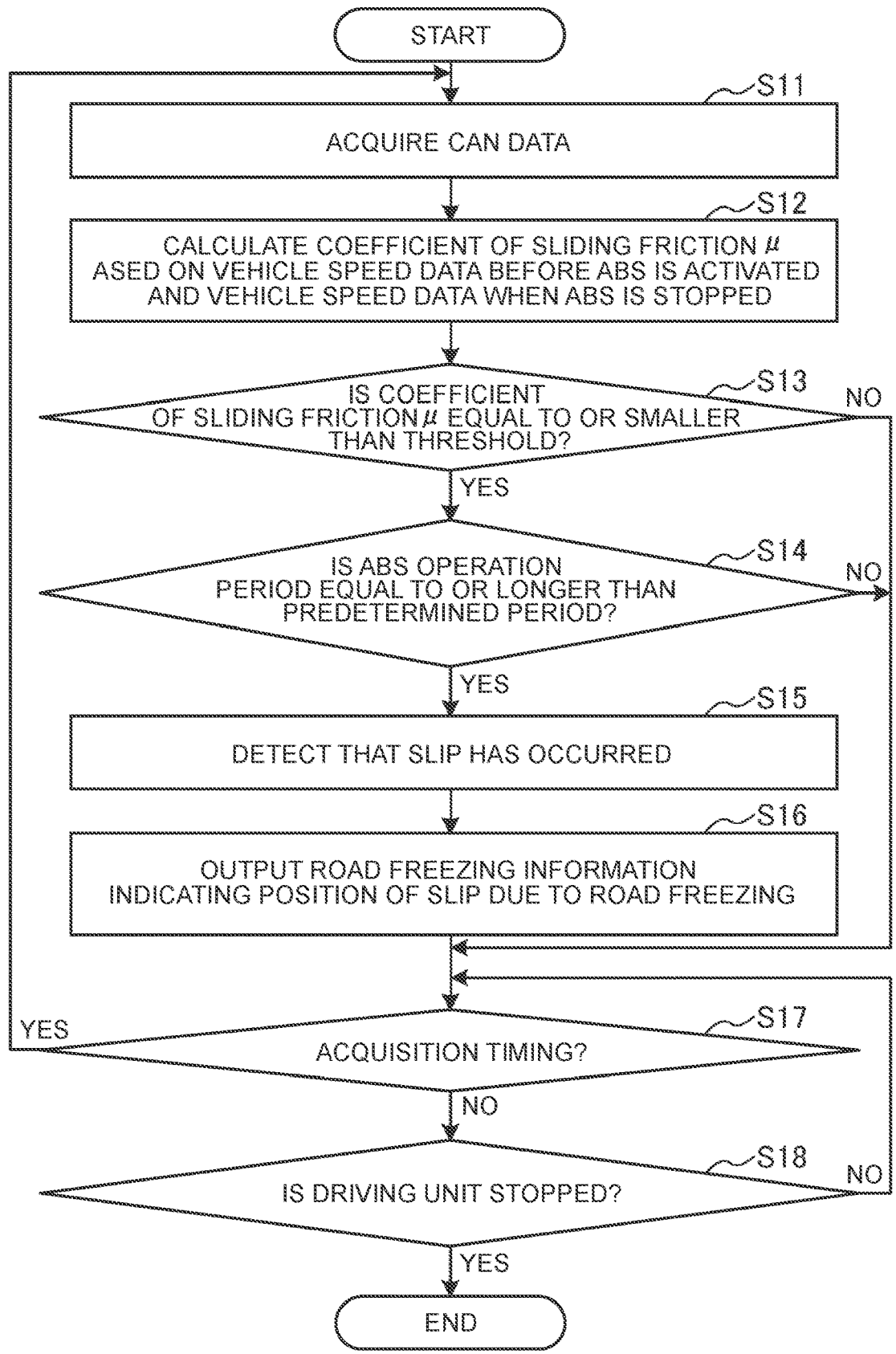
FIG. 19 is a flowchart illustrating an overview of a process to be executed by a driving assistance apparatus according to a second embodiment.

FIG. 19 is a flowchart illustrating an overview of a process to be executed by the driving assistance apparatus 20. In FIG. 19, Step S11 to Step S13 correspond to Step S1 to Step S3 of FIG. 15, respectively.

In Step S14, the determination unit 243 determines whether an ABS operation period contained in the CAN data is equal to or longer than the predetermined period, for example, equal to or longer than 1.6 seconds. When the determination unit 243 determines that the ABS operation period contained in the CAN data is equal to or longer than the predetermined period (Step S14: Yes), the driving assistance apparatus 20 proceeds to Step S15 described later. When the determination unit 243 determines that the ABS operation period contained in the CAN data is not equal to or longer than the predetermined period (Step S14: No), the driving assistance apparatus 20 proceeds to Step S17.

Step S15, Step S16, Step S17, and Step S18 respectively correspond to Step S4, Step S5, Step S6, and Step S7 of FIG. 15.

According to the second embodiment, the control unit 24 determines whether the operation period of the ABS is equal to or longer than the predetermined period. When the operation period of the ABS is equal to or longer than the predetermined period, the control unit 24 detects that the slip due to the road freezing has occurred. As a result, the slip due to the road freezing and the slip due to other factors can be detected while being distinguished from each other.

Other Embodiments

In the first and second embodiments, the functions of the control unit 24 of the driving assistance apparatus 20, that is, the acquisition unit 241, the calculation unit 242, the determination unit 243, the detection unit 244, and the communication control unit 245 may be provided in the ECU 19. In this case, the ECU 19 may transmit the position where the slip due to the road freezing is detected to other vehicles traveling around the vehicle 10 through vehicle-to-vehicle communication. The ECU 19 may transmit the position where the slip due to the road freezing is detected to the external server that records map data.

In the driving assistance system 1 according to each of the first and second embodiments, the term "unit" may be read as a term "circuit" or the like. For example, "control unit" may be read as "control circuit".

The program to be executed in the driving assistance system 1 according to each of the first and second embodiments is provided by being recorded in a computer-readable recording medium such as a compact disc read only memory (CD-ROM), a flexible disk (FD), a compact disc-recordable (CD-R), a digital versatile disk (DVD), a universal serial bus (USB) medium, or a flash memory in the form of installable or executable file data.

The program to be executed in the driving assistance system 1 according to each of the first and second embodiments may be provided by being stored in a computer connected to a network such as the Internet and downloaded via the network.

In the description of each flowchart herein, the chronological relationship of the processes between the steps is clearly expressed by using the terms such as "first", "then", and "subsequently", but the order of the processes necessary to implement the embodiments is not uniquely determined by those terms. That is, the order of the processes in each flowchart described herein may be changed without causing contradiction.

Further effects and modifications may easily be derived by persons having ordinary skill in the art. Broader aspects of the present disclosure are not limited to the specific detailed and representative embodiments stated and described in the above. Thus, various modifications may be made without departing from the spirit or scope of the overall concept of the disclosure defined by the appended claims and their equivalents.

What is claimed is:

1. A driving assistance apparatus comprising a processor having hardware, the processor being configured to:
acquire vehicle speed data before an ABS of a vehicle is activated and vehicle speed data when the ABS of the vehicle is stopped;
calculate a coefficient of sliding friction based on the vehicle speed data before the ABS is activated and the vehicle speed data when the ABS is stopped;
determine whether the coefficient of sliding friction is equal to or smaller than a threshold; and
detect that a slip due to road freezing has occurred when the coefficient of sliding friction is equal to or smaller than the threshold.

2. The driving assistance apparatus according to claim 1, wherein the vehicle speed data before the ABS is activated is vehicle speed data immediately before the ABS is activated, vehicle speed data that is one period earlier and sampled immediately before the ABS is activated, or last vehicle speed data before the ABS is activated.

3. The driving assistance apparatus according to claim 1, wherein the vehicle speed data before the ABS is activated is vehicle speed data that is one period earlier and sampled immediately before the ABS is activated.

4. The driving assistance apparatus according to claim 1, wherein the processor is configured to:
determine whether an operation period of the ABS is equal to or longer than a predetermined period; and
detect that the slip due to the road freezing has occurred when the operation period of the ABS is equal to or longer than the predetermined period.

5. The driving assistance apparatus according to claim 1, wherein the processor is configured to output, to another vehicle or an external server that records map data, road freezing information indicating a position where the slip has been detected due to the road freezing.

6. The driving assistance apparatus according to claim 1, wherein:
the processor is configured to acquire CAN data of the vehicle; and
the CAN data contains at least the vehicle speed data before the ABS of the vehicle is activated and the vehicle speed data when the ABS of the vehicle is stopped.

7. The driving assistance apparatus according to claim 6, wherein the CAN data is acquired at every predetermined time.

8. A driving assistance method to be executed by a driving assistance apparatus including a processor having hardware, the driving assistance method comprising:

acquiring vehicle speed data before an ABS of a vehicle is activated and vehicle speed data when the ABS of the vehicle is stopped;

calculating a coefficient of sliding friction based on the vehicle speed data before the ABS is activated and the vehicle speed data when the ABS is stopped;

determining whether the coefficient of sliding friction is equal to or smaller than a threshold; and detecting that a slip due to road freezing has occurred when the coefficient of sliding friction is equal to or smaller than the threshold.

9. The driving assistance method according to claim 8, wherein the vehicle speed data before the ABS is activated is vehicle speed data immediately before the ABS is activated, vehicle speed data that is one period earlier and sampled immediately before the ABS is activated, or last vehicle speed data before the ABS is activated.

10. The driving assistance method according to claim 8, wherein the vehicle speed data before the ABS is activated is vehicle speed data that is one period earlier and sampled immediately before the ABS is activated.

11. The driving assistance method according to claim 8, further comprising:

determining whether an operation period of the ABS is equal to or longer than a predetermined period; and detecting that the slip due to the road freezing has occurred when the operation period of the ABS is equal to or longer than the predetermined period.

12. The driving assistance method according to claim 8, further comprising outputting, to another vehicle or an external server that records map data, road freezing information indicating a position where the slip has been detected due to the road freezing.

13. The driving assistance method according to claim 8, further comprising acquiring CAN data of the vehicle, wherein the CAN data contains at least the vehicle speed data before the ABS of the vehicle is activated and the vehicle speed data when the ABS of the vehicle is stopped.

14. The driving assistance method according to claim 13, further comprising acquiring the CAN data at every predetermined time.

15. A non-transitory storage medium storing instructions that are executable by one or more processors having hardware and that cause the one or more processors to perform functions comprising:

acquiring vehicle speed data before an ABS of a vehicle is activated and vehicle speed data when the ABS of the vehicle is stopped;

calculating a coefficient of sliding friction based on the vehicle speed data before the ABS is activated and the vehicle speed data when the ABS is stopped;

determining whether the coefficient of sliding friction is equal to or smaller than a threshold; and detecting that a slip due to road freezing has occurred when the coefficient of sliding friction is equal to or smaller than the threshold.

16. The non-transitory storage medium according to claim 15, wherein the vehicle speed data before the ABS is activated is vehicle speed data immediately before the ABS is activated, vehicle speed data that is one period earlier and sampled immediately before the ABS is activated, or last vehicle speed data before the ABS is activated.

17. The non-transitory storage medium according to claim 15, wherein the vehicle speed data before the ABS is activated is vehicle speed data that is one period earlier and sampled immediately before the ABS is activated.

18. The non-transitory storage medium according to claim 15, the functions further comprising:

determining whether an operation period of the ABS is equal to or longer than a predetermined period; and detecting that the slip due to the road freezing has occurred when the operation period of the ABS is equal to or longer than the predetermined period.

19. The non-transitory storage medium according to claim 15, the functions further comprising outputting, to another vehicle or an external server that records map data, road freezing information indicating a position where the slip has been detected due to the road freezing.

20. The non-transitory storage medium according to claim 15, the functions further comprising acquiring CAN data of the vehicle, wherein the CAN data contains at least the vehicle speed data before the ABS of the vehicle is activated and the vehicle speed data when the ABS of the vehicle is stopped.

* * * * *